(No Model.) 2 Sheets—Sheet 1.
A. BORTOLUZZI.
TOBACCO PIPE.
No. 537,381. Patented Apr. 9, 1895.
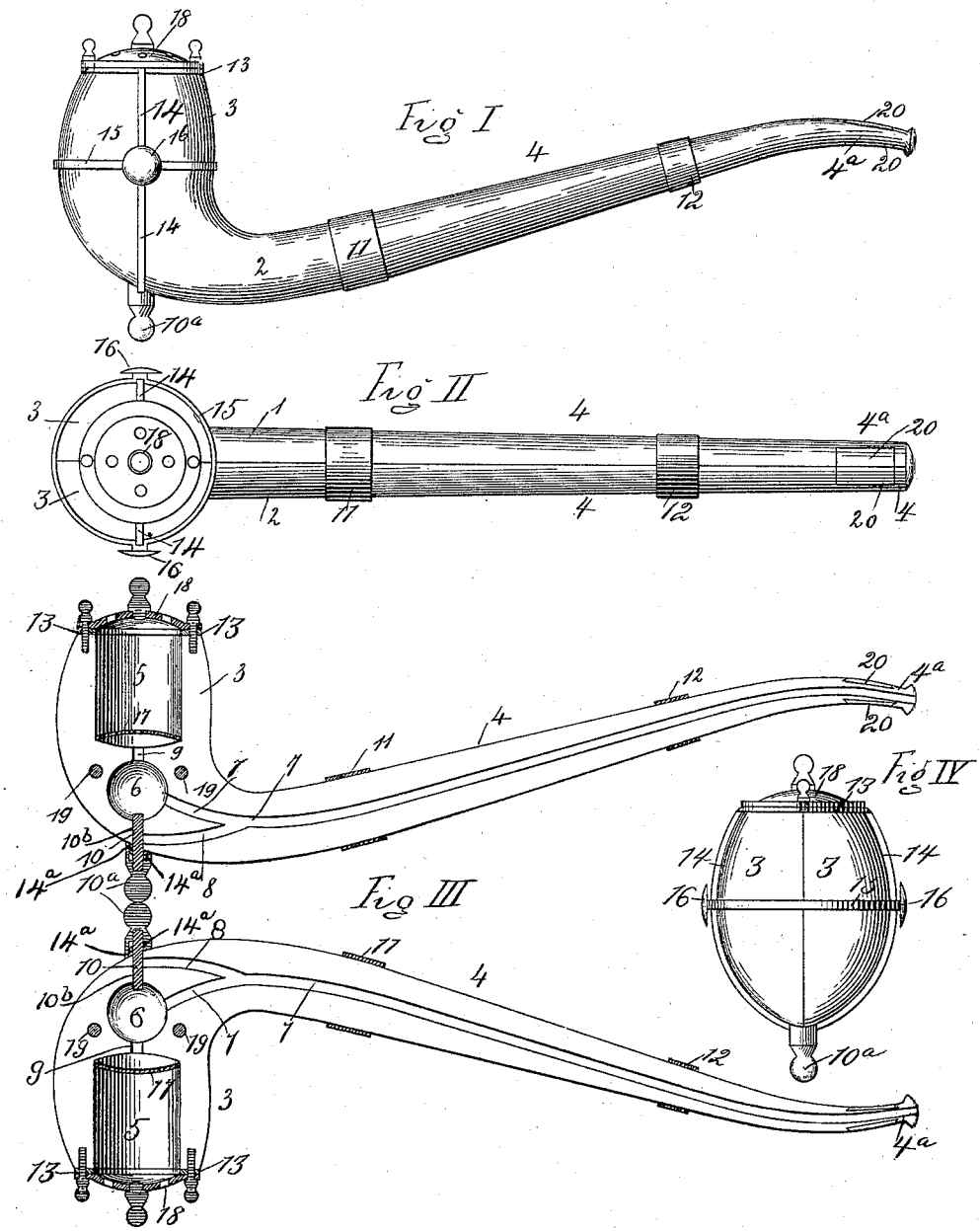

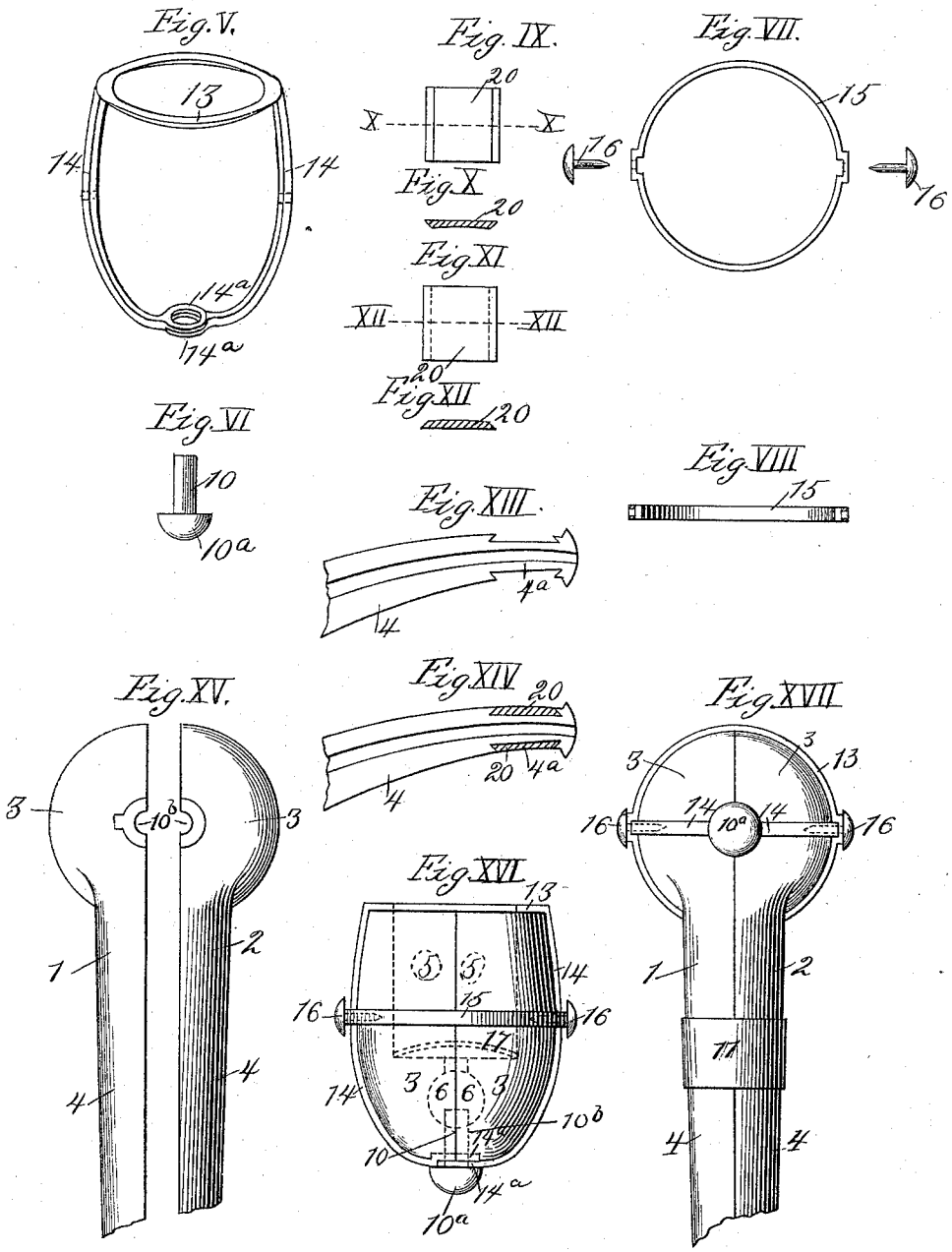

UNITED STATES PATENT OFFICE.

ANDREW BORTOLUZZI, OF BROOKLYN, NEW YORK.

TOBACCO-PIPE.

SPECIFICATION forming part of Letters Patent No. 537,381, dated April 9, 1895.

Application filed September 22, 1894. Serial No. 523,768. (No model.)

*To all whom it may concern:*

Be it known that I, ANDREW BORTOLUZZI, a citizen of the United States, residing at Brooklyn, in the county of Kings and State of New York, have invented certain new and useful Improvements in Tobacco-Pipes, of which the following is a specification.

My improvements relate first, to a construction of pipe enabling it to be readily cleaned, and, second, to a special form and arrangement of trap for nicotian, &c., which is readily possible of use by reason of the adoption of the first mentioned improvement.

I will first fully describe my invention with reference to the accompanying drawings and reserve for the claims the pointing out of the novel features and combinations.

In said drawings, Figure I is a side elevation of a pipe embodying my invention. Fig. II is a top view thereof. Fig. III is a view showing elevations of the two halves of the pipe which are made apart. Fig. IV is an end view. Fig. V is a perspective view of the bowl-frame. Fig. VI is an elevation of the plug. Fig. VII is a plan view of the ring and fastenings. Fig. VIII is an axial section of the ring. Fig. IX is a top view of a reinforcing piece for a mouth piece. Fig. X is a section on the line X—X Fig. IX. Fig. XI is a bottom view. Fig. XII is a section on the line XII—XII Fig. XI. Fig. XIII is an elevation of the mouth of one section the reinforcing pieces being omitted. Fig. XIV is a similar view the reinforcing pieces being in place. Fig. XV is a bottom view of the bowl end of the sections separated. Fig. XVI is an elevation of the bowl end of the pipe. Fig. XVII is a bottom view of the bowl end of the pipe.

The pipe is divided in a single vertical plane axial both of the bowl 3 and the stem 4 through the pipe into two sections 1, 2. Thus, when the pipe is opened all its interior channels are exposed—the bowl 3, the cavity 5, the trap 6 and the smoke ducts 7, 8, 9. On account of the facility in cleaning I am thus enabled to use a preferred form of trap which would, with any other system of opening the pipe for cleaning, be incapable of use on account of the perplexity of its channels.

At the bottom of the tobacco chamber 5 a short vertical duct 9 leads to the trap 6 beneath whence the main smoke channel 7 leads to the mouth piece 4$^a$ of the pipe. A return channel 8 from the smoke duct 7 serves to return any liquid which may pass the trap 6 into duct 7.

A removable plug 10 which may or may not be screw-threaded having a head or knob 10$^a$, serves not only to close the outlet to the trap 6 and to the return channel 8 but to assist in holding the pipe together as hereinafter explained.

10$^b$ is the central vertical lower duct in the base of the bowl of the pipe through which the plug extends into the trap.

The stem of the pipe, when the two parts 1, 2 are put together, is held by sleeves 11, 12. The bowl is then clamped by placing upon it the bowl-frame having a ring 13 which has depending from it and attached to it bands 14 having eye pieces 14$^a$. Over this is then slipped a horizontal ring 15 and the screws or plugs 16, 10, are then inserted to hold the frame and horizontal ring in place. The pipe is thus bound by horizontal and vertical bands.

The perforated guard plate 17 may be dropped into the tobacco chamber after the pipe is put together and the lid 18 may be screwed to the ring and bowl, as shown in Fig. III, or it may be permanently attached to the horizontal ring 13 only, as shown in Fig. IV.

Dowels 19 on one of the pipe sections may enter corresponding holes in the other section to assist in putting the pipe together.

20 are reinforcing pieces of bone or other material made dovetailed to occupy grooves in the mouth piece. There are four pieces two above and two beneath the mouth-piece and when the two halves are fitted together the pieces are retained in place.

Having thus described my invention, the following is what I claim and desire to secure by Letters Patent:

1. The combination, with a pipe longitudinally divided on a vertical line into two parts 1, 2, and having a central vertical lower duct 10$^b$ in the base of the bowl; of the bowl-frame comprising the upper ring 13, and the bowl-bands 14, having eye-pieces 14$^a$ at their lower ends, and the lower ring 15 secured to the bowl-bands, the plug 10 fitting in the lower duct, and coupling the eye-pieces, and the stem-bands; substantially as described.

2. A pipe longitudinally divided on a vertical line into two parts, 1, 2, having a bowl 3, a cavity 5, a trap 6 beneath the cavity, a short duct 9, connecting the cavity with the trap, the main channel 7, connected directly to the cavity and extending therefrom through the stem of the pipe, a return channel 8 extending from the main channel to a point beneath the trap, the bowl-frame comprising the upper ring 13, and the bowl-bands 14, having eye pieces 14ª at their lower ends and the lower ring 15 secured to the bowl-bands, the stem-bands and the plug 10 coupling the eye pieces, extending across the return channel and into the trap, in line with the bowl; substantially as described.

ANDREW BORTOLUZZI.

Witnesses:
M. V. BIDGOOD,
C. M. OTT.